United States Patent
Xia et al.

(10) Patent No.: US 9,876,596 B2
(45) Date of Patent: Jan. 23, 2018

(54) METHOD AND DEVICE FOR DETECTING FAULT IN SYNCHRONIZATION LINK

(71) Applicant: ZTE Corporation, Shenzhen, Guangdong (CN)

(72) Inventors: Liang Xia, Shenzhen (CN); Bin Wang, Shenzhen (CN); Junhui Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 270 days.

(21) Appl. No.: 14/899,564

(22) PCT Filed: Nov. 22, 2013

(86) PCT No.: PCT/CN2013/087731
§ 371 (c)(1),
(2) Date: Jan. 22, 2016

(87) PCT Pub. No.: WO2014/082547
PCT Pub. Date: Jun. 5, 2014

(65) Prior Publication Data
US 2016/0149658 A1    May 26, 2016

(30) Foreign Application Priority Data
Nov. 28, 2012    (CN) .......................... 2012 1 0494667

(51) Int. Cl.
*H04L 12/24*    (2006.01)
*H04J 3/06*    (2006.01)

(52) U.S. Cl.
CPC .......... *H04J 3/0641* (2013.01); *H04J 3/0644* (2013.01); *H04J 3/0667* (2013.01); *H04L 41/06* (2013.01)

(58) Field of Classification Search
CPC ...... H04J 3/0641; H04J 3/0667; H04J 3/0644; H04L 41/06
See application file for complete search history.

(56) References Cited

U.S. PATENT DOCUMENTS

| | | | |
|---|---|---|---|
| 9,288,777 B2* | 3/2016 | Hollabaugh | H04W 56/0035 |
| 2004/0141526 A1* | 7/2004 | Balasubramanian | H04J 3/0667 370/503 |

FOREIGN PATENT DOCUMENTS

| | | |
|---|---|---|
| CN | 101399655 A | 4/2009 |
| CN | 102148652 A | 8/2011 |

OTHER PUBLICATIONS

International Search Report in international application No. PCT/CN2013/087731, dated Feb. 6, 2014.
(Continued)

*Primary Examiner* — Jamal Javaid
(74) *Attorney, Agent, or Firm* — Oppedahl Patent Law Firm LLC (57) ABSTRACT

Disclosed are a method and a device for detecting a fault in a synchronization link. The method includes: setting one or more reference nodes corresponding to a node to be detected (101); when the node to be detected starts a detection function, acquiring reference time from the one or more reference nodes and acquiring synchronization time from a synchronization path (102); and determining, by the node to be detected, whether there is a fault in the synchronization link between the node to be detected and a Grandmaster Clock (GM) node by using all the reference time and the synchronization time (103).

12 Claims, 4 Drawing Sheets

(56) References Cited

OTHER PUBLICATIONS

English Translation of the Written Opinion of the International Search Authority in international application No. PCT/CN2013/087731, dated Feb. 6, 2014.

* cited by examiner

METHOD AND DEVICE FOR DETECTING FAULT IN SYNCHRONIZATION LINK

TECHNICAL FIELD

The present disclosure relates to a synchronization detection technology in the field of Packet Transfer Network (PTN), and in particular to a method and a device for detecting a fault in a synchronization link.

BACKGROUND

At present, in a PTN requiring high-precision time synchronization, a Precision Time Protocol (PTP) is generally employed to perform the 1588 time synchronization of nodes. In the PTN, a node employing PTP to perform time synchronization is called a PTP node. PTP nodes generally may include a Grandmaster Clock (GM) node, a Boundary Clock (BC) node and a Transparent Clock (TC) node. The method for PTP time synchronization may include that after a GM node establishes a synchronization link with BC nodes, the GM node transmits synchronization time to a BC node and then the BC nodes accomplish time synchronization one by one.

With the rapid development of mobile communication network technologies, the PTN network is getting larger and more complicated. Once a certain BC node has a time error, for example, time error caused by a frequency layer fault or a fault generated by a device during time transfer, other BC nodes behind this BC node with fault in the synchronization link will have a bigger synchronization time error, which finally affects the normal operation of services in the system. Generally, the fault detection on a synchronization link is conducted by a network administrator node by node. However, since there is a huge number of PTP nodes involved in synchronization in a PTN, it is very time-consuming to locate the fault manually. Moreover, manual detection not only raises the network management and maintenance cost but also impacts the reliability of the network.

Since fault detection is manually conducted on a node in a system in the existing technologies, a fault link cannot be identified rapidly, and thus the network management and maintenance cost cannot be reduced and the reliability of network cannot be guaranteed.

SUMMARY

In view of the above, the embodiments of the present disclosure provide a method and a device for detecting a fault in a synchronization link, which can rapidly identify the fault link in a synchronization link and reduce the management and maintenance cost of the network, thereby guaranteeing the reliability of the network.

The technical solutions of the present disclosure are implemented as follows.

The embodiment of the present disclosure provides a method for detecting a fault in a synchronization link, including that:

one or more reference nodes are set corresponding to a node to be detected;

when the node to be detected starts a detection function, the node to be detected acquires reference time from the one or more reference nodes and acquires synchronization time from a synchronization path; and the node to be detected determines whether there is a fault in the synchronization link between the node to be detected and a GM node by using all the reference time and the synchronization time.

In the above solution, the step of the node to be detected starting the detection function may include: the node to be detected establishes with the one or more reference nodes one or more detection links which are not overlapped with the existing synchronization link, and transmits a time fault detection message in the one or more detection links in a TC mode.

In the above solution, the step of acquiring the reference time from the one or more reference nodes includes: the node to be detected interacts time stamp information with the one or more reference nodes via a time fault detection message through the one or more detection links, calculates a time offset between the node to be detected itself and a corresponding reference node one by one according to the time stamp information acquired through the detection link, and finally calculates the reference time according to the time offset.

In the above solution, the step of the node to be detected determining whether there is a fault in the synchronization link between the node to be detected itself and the GM node by using all the reference time and the synchronization time includes:

detecting whether all the reference time is available reference time, if not, ending the process;

otherwise, selecting reference time and calculating a difference between the reference time and the synchronization time; if the difference is greater than a preset fault threshold, determining that there is a fault in the synchronization link between the node to be detected and the GM node; if the difference is not greater than a preset fault threshold, determining that there is no fault in the synchronization link between the node to be detected and the GM node.

In the above solution, the step of detecting whether all the reference time is available reference time includes: calculating a difference between any two of the reference time; if the calculated difference is less than a preset threshold, determining that all the reference time is available reference time.

In the above solution, before setting the one or more reference nodes corresponding to the node to be detected, the method further includes: detecting whether there is a synchronization link having a fault;

this detection includes: selecting a BC node in a synchronization link, wherein the BC node acquires in real time a time offset between the BC node itself and a BC node in an adjacent synchronization link to serve as a comparison offset; calculating a difference between the comparison offset and a synchronization time offset, and determining that the synchronization link on which the BC node is located has a fault if the difference is greater than a preset time difference threshold.

In the above solution, before setting the one or more reference nodes corresponding to the node to be detected, the method further includes: detecting whether there is a synchronization link having a fault;

this detection includes: selecting in a synchronization link a BC node having a Global Positioning System (GPS) function, wherein the BC node acquires external reference time via the GPS function and checks synchronization time periodically acquired by itself, calculating a difference between the external reference time and the synchronization time, determining that the synchronization link on which the BC node is located has a fault if the difference is greater than a preset fault threshold, and determining that the synchronization link on which the BC node is located has no fault if the difference is not greater than a preset fault threshold.

The embodiment of the present disclosure also provides a device for detecting a fault in a synchronization link, including: a synchronization detection management module, one or more virtual slave port modules and a slave port module.

The synchronization detection management module is configured to: set one or more reference nodes corresponding to a node to be detected, notify each of the virtual slave port modules to acquire reference time and notify the slave port module to begin acquiring synchronization time when the detection function is started, and determine whether there is a fault in the synchronization link between the node to be detected and a GM node by using all the reference time sent from the one or more virtual slave port modules and the synchronization time sent from the slave port module.

The virtual slave port module is configured to acquire the reference time from a reference node according to the notification from the synchronization detection management module and to send the reference time to the synchronization detection management module.

The slave port module is configured to acquire the synchronization time from a synchronization path according to the notification from the synchronization detection management module and to send the synchronization time to the synchronization detection management module.

In the above solution, the virtual slave port module is configured to establish, with the reference node, a detection link which is not overlapped with the existing synchronization link when the detection function is started and to transmit a time fault detection message in the detection link in a TC mode.

In the above solution, the virtual slave port module is configured to interact time stamp information with the reference node via a time fault detection message through the detection link, to calculate a time offset between itself and the corresponding reference node according to the time stamp information, and to calculate the reference time according to the time offset.

In the above solution, the synchronization detection management module is configured to: detect whether all the reference time is available reference time, if not, end the process; otherwise, select reference time and calculate a difference between the reference time and the synchronization time; if the difference is greater than a preset fault threshold, determine that there is a fault in the synchronization link between the node to be detected and the GM node; otherwise, determine that there is no fault in the synchronization link between the node to be detected and the GM node.

In the above solution, the synchronization detection management module is configured to calculate a difference between any two of the reference time, and, if the calculated difference is less than a preset threshold, determine that all the reference time is available reference time.

In the above solution, the device further includes: a passive port module configured to acquire a time offset between the passive port module itself and a BC node in an adjacent synchronization link to serve as a comparison offset when receiving a notification to start fault detection function from the synchronization detection management module, and to send the comparison offset to the synchronization detection management module;

accordingly, the synchronization detection management module is configured to: notify the passive port module to start the fault detection function when determining to start detecting whether there is a fault in the synchronization link on which a BC node is located, acquire the comparison offset sent from the passive port module, calculate a difference between the comparison offset and the synchronization time offset sent from the slave port module, and, if the difference is greater than a preset time difference threshold, determine that the synchronization link on which the BC node is located has a fault;

the slave port module is configured to send the synchronization time offset to the synchronization detection management module.

In the above solution, the device further includes: a GPS function module configured to send external reference time to the synchronization detection management module after acquiring the external reference time according to the notification sent from the synchronization detection management module;

accordingly, the synchronization detection management module is configured to: notify the GPS function module to acquire the external reference time when determining to start detecting whether there is a fault on the synchronization link on which a BC node is located, receive the external reference time sent from the GPS function module, calculate a difference between the external reference time and the synchronization time sent from the slave port module; if the difference is greater than a preset fault threshold, determine that the synchronization link on which the BC node is located has a fault; otherwise, determine that the synchronization link on which the BC node is located has no fault.

According to the embodiments of the present disclosure, the method and the device for detecting a fault in a synchronization link can set a reference node corresponding to a node to be detected, acquire reference time from the reference node and acquire synchronization time from a synchronization path. When it is determined that the link between the node to be detected and the GM node has a fault according to the reference time and the synchronization time, a fault in the link can be rapidly identified. As such, manual detection of fault on nodes one by one can be avoided in a synchronization link, and the fault link can be rapidly identified from the synchronization link.

Preferably, according to the embodiments of the present disclosure, it also can be determined whether a synchronization link on which a BC node is located has a fault by acquiring a synchronization time offset of the BC node in the synchronization link, acquiring a time offset between the BC node and a BC node in an adjacent synchronization link, and comparing the two time offsets. Alternatively, it also can be determined whether a synchronization link on which a BC node is located has a fault by selecting a BC node which has a GPS function in the synchronization link and calculating the difference between the external reference time acquired by the GPS function and the current synchronization time. Thus, the problem that manual operation cannot determine which synchronization link has a fault in the current system is solved, and rapid locating of synchronization link is implemented. Therefore, the management and maintenance cost of the network is reduced, and the reliability of the network is guaranteed.

DETAILED DESCRIPTION

In the embodiments of the present disclosure, one or more reference nodes are set corresponding to a node to be detected; when the node to be detected starts a detection function, the node to be detected acquires reference time from the one or more reference nodes and acquires synchronization time from a synchronization path; and the node to be detected determines whether there is a fault in the synchronization link between the node to be detected and a GM node using all the reference time and the synchronization time.

The present disclosure is described below in further detail in conjunction with accompanying drawings and specific embodiments.

Embodiment 1

Figure 1:
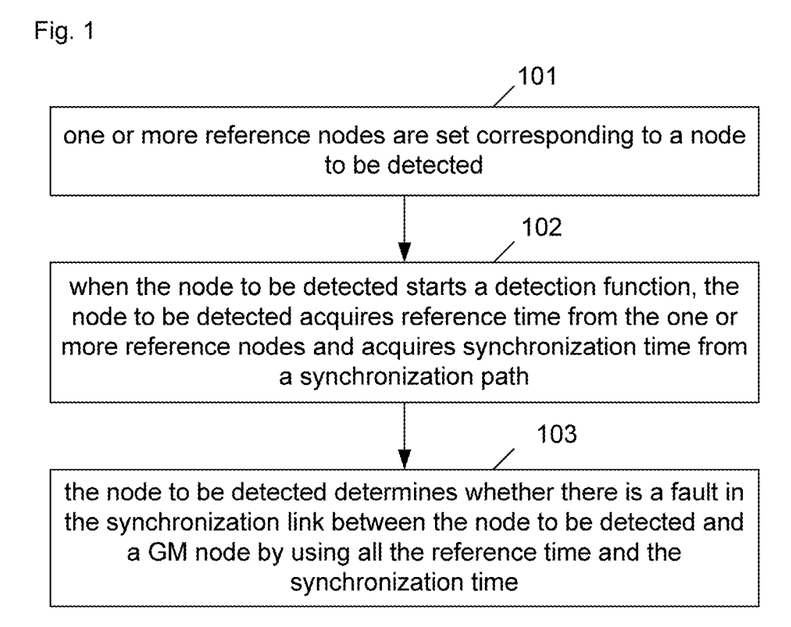
FIG. 1 is a flowchart showing a method for detecting a fault in a synchronization link according to an embodiment of the present disclosure.

The embodiment of the present disclosure provides a method for detecting a fault in a synchronization link. As shown in FIG. 1, the method includes the following steps.

Step 101: one or more reference nodes are set corresponding to a node to be detected.

Specifically, when it is determined to detect a fault in any synchronization link that has a fault, a node to be detected is selected from the synchronization link and one or more reference nodes are set corresponding to the node to be detected.

Here, the node to be detected is a BC node in a synchronization link which is determined to have a fault in a PTN. The BC node calculates the time synchronization relationship among a GM node, a BC node and a TC node or between nodes according to the Best Master Clock (BMC) protocol specified by the existing PTP technology in the PTN, and the specific implementation method is not described here. The reference node might be a GM node selected from the PTN according to actual conditions.

Step 102: when the node to be detected starts a detection function, the node to be detected acquires reference time from the one or more reference nodes and acquires synchronization time from a synchronization path.

Here, the detection function refers to that the node to be detected establishes a detection link with each of reference nodes according to the number of the selected reference nodes, and interacts time stamp information with the each of reference nodes via a time fault detection message through the detection link. The establishment of the detection link includes: selecting, in the node to be detected, the same number of passive ports and/or master ports as the number of the reference nodes, setting all the selected passive ports and/or master ports as virtual slave ports, assigning, for each of the virtual slave port, an IP address for a corresponding reference node, establishing a connection with the reference node via the virtual slave port according to the three-layer Internet Protocol (IP) in the existing technology to serve as a detection link, wherein the detection link is not overlapped with the existing synchronization link; configuring a Transparent Clock (TC) channel in the detection link between the node to be detected and the reference node, wherein the time fault detection message is transmitted between nodes in a TC mode.

The passive and master ports are differentiated dependent on receiving or transmitting information in the PTP node as functional ports in the existing technology, wherein the passive port neither sends nor receives synchronization clock, while the master port sends synchronization clock.

Acquiring reference time from the one or more reference nodes includes: the node to be detected interacts time stamp information with the one or more reference nodes via a time fault detection message through the one or more detection links, calculates the time offset between the node to be detected and the corresponding reference node one by one according to the time stamp information acquired through the detection link, and calculates the respective reference time according to the time offset.

The time fault detection message might be information periodically interacted between a master clock node and a slave clock node specified in a Request-Response mechanism or Peer-Delay mechanism in the existing PTP technology, including: Synchronization (Sync) message, Delay-Request (Delay-Req) message, Delay-Response message and so on. The time fault detection message also might be a Bidirectional Forwarding Detection (BFD) message.

Calculation of the time offset between the node to be detected and the corresponding reference node according to the time stamp information acquired through the detection link may be based on the existing technology, and the implementation is related to the selected PTP mechanism. For example, if the Request-Response mechanism is applied, the node to be detected receives a Sync message periodically sent from a reference node, records the message receiving time (t2) and extracts from the Sync message the message sending time (t1); the node to be detected sends a Delay-Req message to the reference node, wherein the sending time (t3) is added to the Delay-Req message; the node to be detected extracts from a Delay-Response message the message sending time (t4) when receiving the Delay-Response message sent from the reference node; the node to be detected divides the difference between (t2−t1) and (t4−t3) by 2 to obtain the time offset between the node to be detected and the reference node. Calculation of the reference time according to the time offset belongs to the existing technology and will not be repeated here.

Acquisition of synchronization time from a synchronization path belongs to the existing technology and might include: the node to be detected interacts time stamp information with a GM node through the synchronization path, calculates the time offset between the node to be detected and the GM node according to the time information recorded in the time stamp information, and calculates the synchronization time according to the time offset.

Step 103: the node to be detected determines whether there is a fault on the synchronization link between the node to be detected and a GM node using all the reference time and the synchronization time.

Specifically, the node to be detected determines whether there is a fault on the synchronization link between the node to be detected and the GM node using all the reference time and the synchronization time, and if there is a fault, the fault on the synchronization link is cleared, and the process is ended; otherwise, another BC node in this synchronization link with a fault is selected as a node to be detected, and the process returns to Step 101.

Here, the step of the node to be detected determining whether there is a fault on the synchronization link between the node to be detected and the GM node using all the reference time and the synchronization time includes: detecting whether all the reference time is available reference time, if not, ending the process;

otherwise, selecting any reference time and calculating the difference between the reference time and the synchronization time; if the difference is greater than a preset fault threshold, determining that there is a fault on the synchronization link between the node to be detected and the GM node; otherwise, determining that there is no fault on the synchronization link between the node to be detected and the GM node.

The fault threshold is a value set according to actual conditions.

Detecting whether all the reference time is available reference time includes: calculating the difference between any two of the reference time, and if the calculated difference is less than a preset threshold, determining that all the reference time is available reference time.

After Step 103 is completed, an administrator can determine the fault node in the synchronization link between the node to be detected and the GM node, and remove the fault from the node, which will not be repeated here.

Preferably, before Step 101, it is needed to detect whether there is a synchronization link having a fault; if so, Step 101 is executed.

This step of detecting might include: selecting a BC node in a synchronization link; after the PTN system is started, acquiring, by the BC node, in real time the time offset between the BC node and a BC node in an adjacent synchronization link to serve as a comparison offset, calculating the difference between the comparison offset and the synchronization time offset, and determining that the synchronization link on which the BC node is located has a fault if the difference is greater than a preset time difference threshold, wherein the time different threshold is a value set according to actual conditions. The step of the BC node acquiring the time offset between the BC node and the BC node in an adjacent synchronization link to serve as the comparison offset includes: the BC node establishes, via its passive port, a detection link with the master port in the BC node in the adjacent synchronization link, acquires time stamp information through the detection link, and calculates the time offset between the BC node itself and the BC node in the adjacent synchronization link to serve as the comparison offset using the time information in the time stamp information.

Alternatively, in a synchronization link, one BC node having a GPS function is selected, wherein the BC node acquires external reference time through the GPS function, views the synchronization time periodically acquired by itself, calculates the difference between the external reference time and the synchronization time, determines that the synchronization link on which the BC node is located has a fault if the difference is greater than a preset fault threshold, and determines that the synchronization link on which the BC node is located has no fault if the difference is not greater than a preset fault threshold.

Embodiment 2

Figure 2:
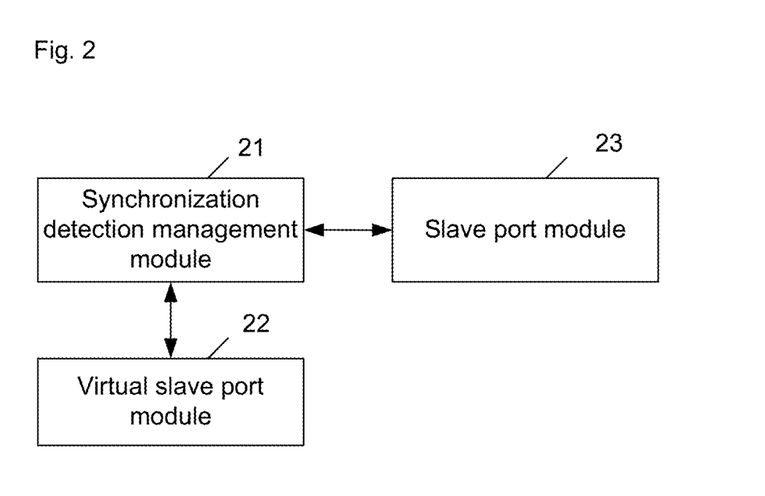
FIG. 2 is a first structural diagram illustrating a device for detecting a fault in a synchronization link according to an embodiment of the present disclosure.

As shown in FIG. 2, the embodiment of the present disclosure provides a device for detecting a fault in a synchronization link, which includes: a synchronization detection management module 21, one or more virtual slave port modules 22 and a slave port module 23.

The synchronization detection management module 21 is configured to: set one or more reference nodes corresponding to the node to be detected, notify each of virtual slave port modules 22 to acquire reference time and notify the slave port module 23 to begin acquiring synchronization time when the detection function is started, and determine whether there is a fault on the synchronization link between the node to be detected and a GM node according to the reference time sent from all the virtual slave port modules 22 and the synchronization time sent from the slave port module 23.

The virtual slave port module 22 is configured to acquire reference time from the reference node according to the notification from the synchronization detection management module 21 and to send the reference time to the synchronization detection management module 21.

The slave port module 23 is configured to acquire synchronization time from a synchronization path according to the notification from the synchronization detection management module 21 and to send the synchronization time to the synchronization detection management module 21.

The synchronization detection management module 21 is configured to notify each of virtual slave port modules 22 to establish a detection link with a reference node according to the number of the selected reference nodes. Correspondingly, the virtual slave port is configured to interact time stamp information with a reference node through the detection link according to the notification sent from the synchronization detection management module 21.

The synchronization detection management module 21 is configured to: select the same number of passive ports and/or master ports as the number of the selected reference nodes, set all the selected passive ports and/or master ports as virtual slave port modules 22, assign for each of virtual slave port modules 22 an IP address for a corresponding reference node. Correspondingly, the virtual slave port module 22 is configured to establish a connection with the reference node according to the three-layer IP protocol in the existing technology to serve as a detection link after receiving the IP address for the reference node from the synchronization detection management module 21.

The virtual slave port module 22 is configured to: interact time stamp information with a reference node through the detection link, calculate the time offset between itself and the corresponding reference node to serve as a reference time offset according to the time information recorded in the time stamp information, and finally calculate the referenced time using the time offset.

The time stamp information might be information periodically interacted between a master clock node and a slave clock node specified in a Request-Response mechanism or Peer-Delay mechanism in the existing PTP technology. For example, if the Request-Response mechanism is applied, when a Sync message periodically sent from a reference node is received, the message receiving time (t2) is recorded and the message sending time (t1) is extracted from the Sync message; a Delay-Req message is sent to the reference node, and the sending time (t3) is added to the Delay-Req message; the message sending time (t4) is extracted from a Delay-Response message upon receipt of the Delay-Response message sent from the reference node; making the difference between (t2−t1) and (t4−t3) as the time offset between the node to be detected and the reference node.

The slave port module 23 is configured to: interact time stamp information with a GM node through the synchronization path, calculate the time offset between itself and the GM node according to the time information recorded in the time stamp information, and calculate the synchronization time according to the time offset.

The synchronization detection management module 21 is configured to: determine whether there is a fault on the synchronization link between itself and a GM node using all the reference time and the synchronization time. If so, the fault is removed from the link; otherwise, the process ends.

The synchronization detection management module 21 is configured to: detect whether all the reference time is available reference time, if not, end the process; otherwise, select any one reference time and calculate the difference between the reference time and the synchronization time; if the difference is greater than a preset fault threshold, determine that there is a fault on the synchronization link between itself and the GM node; otherwise, determine that there is no fault on the synchronization link between itself and the GM node.

The synchronization detection management module 21 is configured to calculate the difference between any two of the reference time, and if the calculated difference is less than a preset threshold, determine that all the reference time is available reference time.

Figure 3:
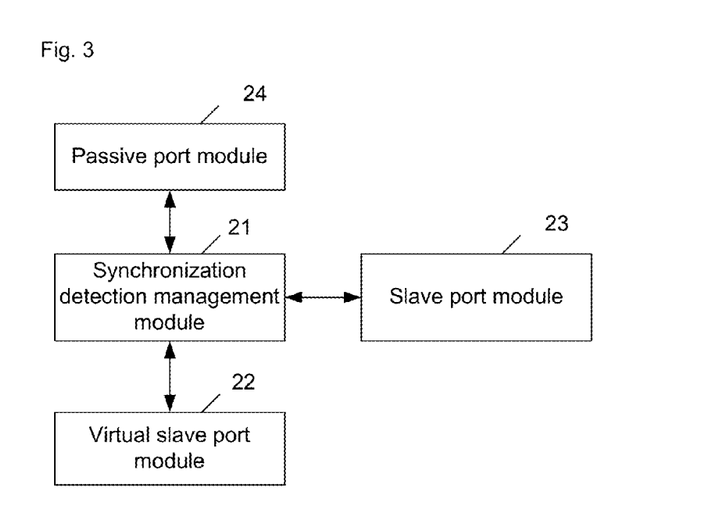
FIG. 3 is a second structural diagram illustrating a device for detecting a fault in a synchronization link according to an embodiment of the present disclosure.

Preferably, as shown in FIG. 3, the device might further include: a passive port module 24, which is configured to acquire the time offset between itself and a BC node in an adjacent synchronization link to serve as a comparison offset when receiving a notification to start the fault detection function from the synchronization detection management module 21, and to send the comparison offset to the synchronization detection management module 21. Correspondingly, the synchronization detection management module 21 is configured to: notify the passive port module 24 to start the fault detection function when determining to start detecting whether there is a fault on the synchronization link on which the BC node is located, receive the comparison offset sent from the passive port module 24, calculate the difference between the comparison offset and the synchronization time offset sent from the slave port module 23, and, if the difference is greater than a preset time difference threshold, determine that the synchronization link on which the BC node is located has a fault. The slave port module 23 is configured to send the synchronization time offset to the synchronization detection management module 21.

Figure 4:
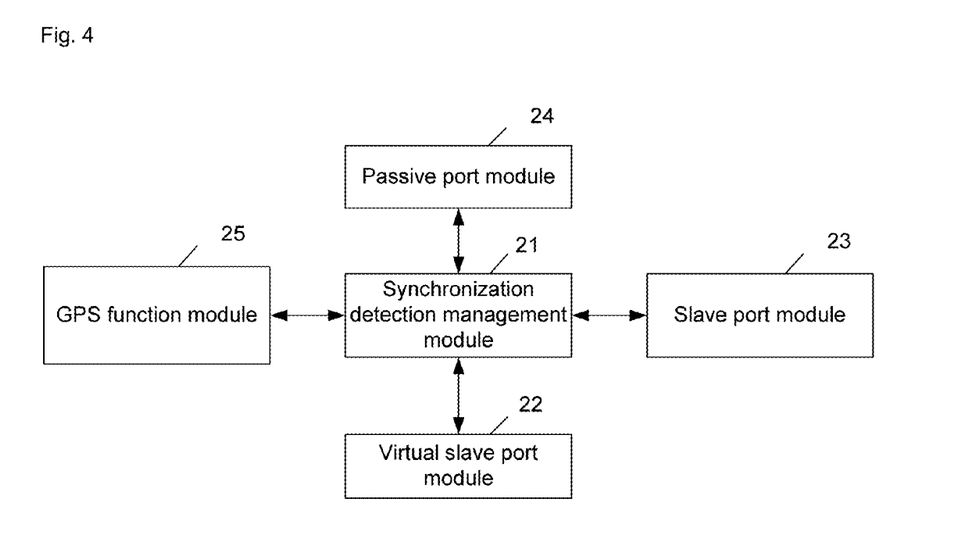
FIG. 4 is a third structural diagram illustrating a device for detecting a fault in a synchronization link according to an embodiment of the present disclosure.

Alternatively, as shown in FIG. 4, the device might further include: a GPS function module 25, which is configured to send external reference time to the synchronization detection management module 21 after acquiring the external reference time according to the notification sent from the synchronization detection management module 21. Correspondingly, the synchronization detection management module 21 is configured to: notify the GPS function module 25 to acquire external reference time when determining to start detecting whether there is a fault on the synchronization link on which the BC node is located, receive the external reference time sent from the GPS function module 25, calculate the difference between the external reference time and the synchronization time sent from the slave port module 23; if the difference is greater than a preset fault threshold, determine that the synchronization link on which the BC node is located has a fault; otherwise, determine that the synchronization link on which the BC node is located has no fault.

The above synchronization detection management module 21, virtual slave port module 22 and slave port module 23 can be set in a BC node as logic units. The passive port module 24 and/or GPS function module 25, together with the synchronization detection management module 21, virtual slave port module 22 and slave port module 23, can be mounted in one same BC node or in different BC nodes.

Figure 5:
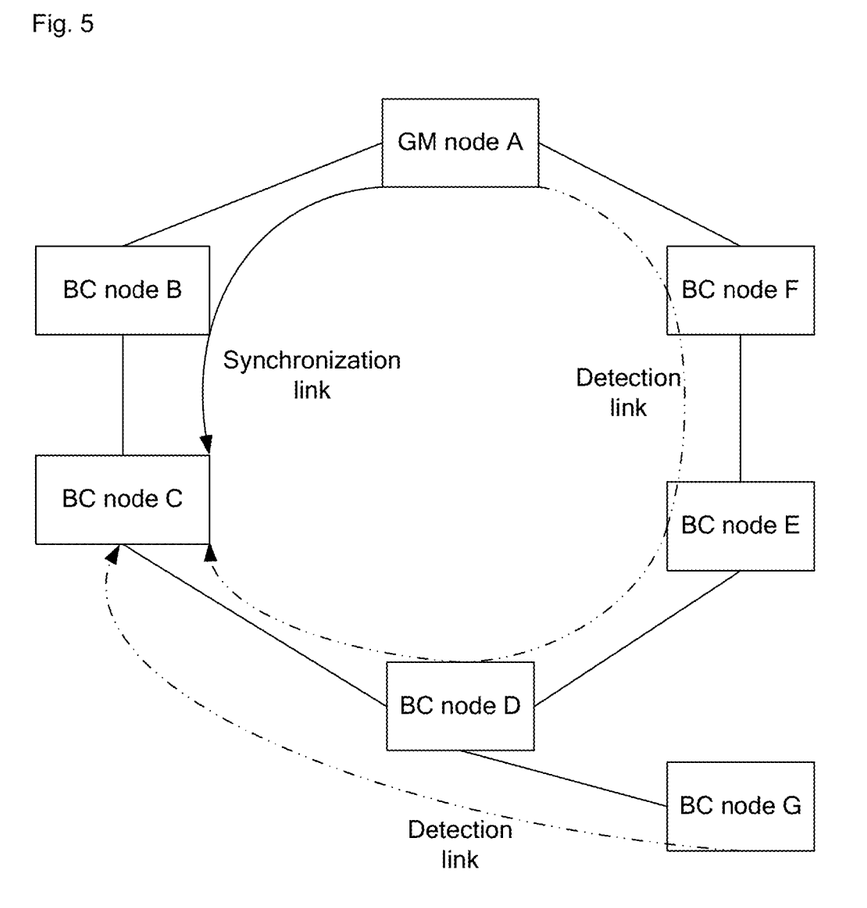
FIG. 5 is a structural diagram illustrating a system according to an embodiment of the present disclosure.

As shown in FIG. 5, there is an assumption of the network connection relationship. Node A is a GM node, node B to node F are BC nodes. According to the Best Master Clock (BMC) algorithm, the synchronization link is expressed by the dotted line as shown in FIG. 5, in which node B locks node A, node C locks node B, node D locks node C; node D is connected with node E through a passive port, and node D is connected with node G through a master port.

After the PTN system is started, node D acquires, through the passive port, the time offset between itself and node E in an adjacent synchronization link in real time to serve as a comparison offset, calculates the difference between the comparison offset and the synchronization time offset, and determines that the synchronization link on which node D is located has a fault if the difference is greater than a preset time difference threshold.

The above synchronization detection management module 21 and virtual slave port module 22 might be implemented by but not limited to the following hardware: Digital Signal Processor (DSP), or Central Processing Unit (CPU), or Field Programmable Gate Array (EPGA) and the like. Both the slave port module 23 and the passive port module 24 might be implemented by the cooperation of Input/Output (I/O) interface hardware and DSP, or CPU or FPGA hardware. The GPS function module 25 might be implemented by GPS hardware.

Embodiment 3

The network connection relationship is assumed as shown in FIG. 5. After it is determined that the synchronization link on which node D is located has a fault, the method for detecting a fault in the synchronization link may further locate the fault, which includes:

Step 301: node C is selected as a node to be detected and two reference nodes A and G are set corresponding to node C.

Step 302: when node C starts the defection function, node C establishes a detection link with node A and node G respectively, acquires reference time from node A and node G, respectively, and acquires synchronization time from a synchronization path.

Step 303: node C determines whether there is a fault on the synchronization link between itself and node A using all the reference time and the synchronization time.

Embodiment 4

Figure 6:
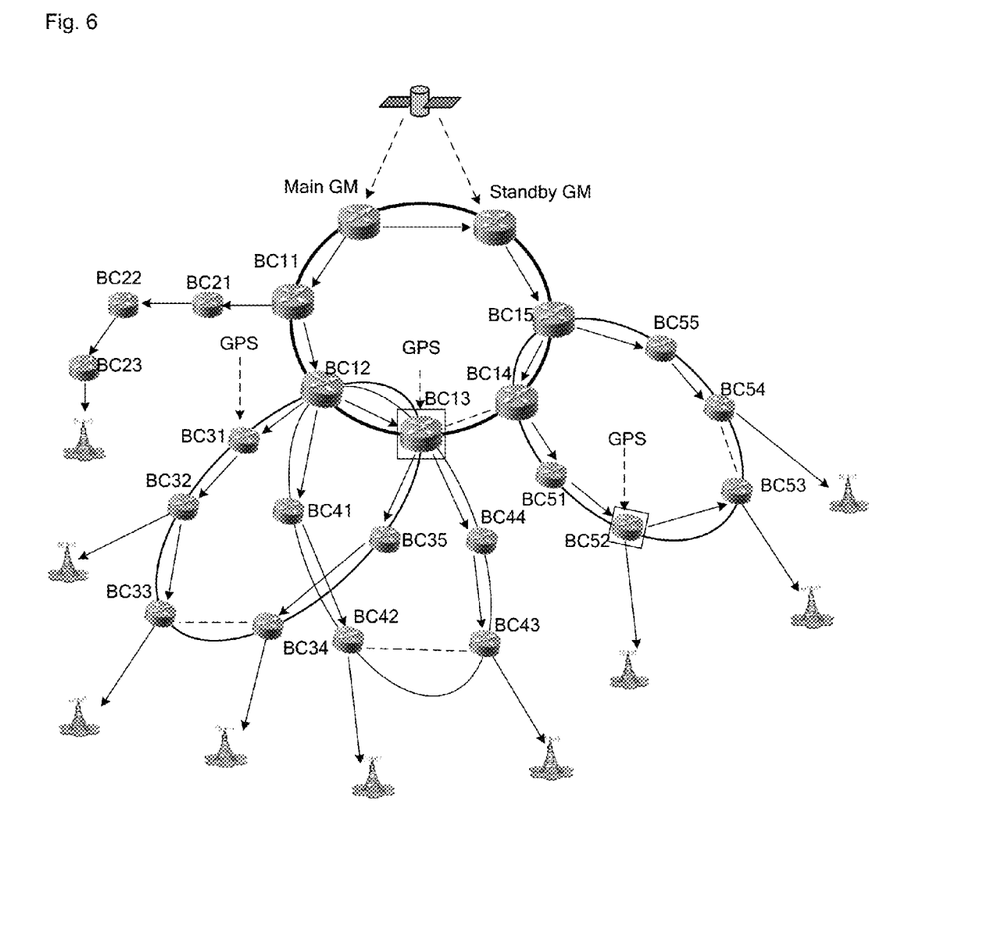
FIG. 6 is a structural diagram illustrating a system according to an embodiment of the present disclosure.

The network connection relationship is shown in FIG. 6, in which node BC13, node BC31 and node BC52 are integrated with a GPS function and are directly connected with a GPS, and thus node BC13, node BC31 and node BC52 can acquire external reference time from the GPS directly.

Node BC13 can calculate the difference between the external reference time and the synchronization time. If the difference is greater than a preset fault threshold, the synchronization link on which node BC13 is located (GM→BC11→BC12→BC13) has a synchronization fault.

The above are the preferred embodiments of the present disclosure only, and are not intended to limit the scope of protection of the present disclosure.

The invention claimed is:

1. A method for detecting a fault in a synchronization link, comprising:
   setting one or more reference nodes corresponding to a node to be detected;
   when the node to be detected starts a detection function, acquiring reference time from the one or more reference nodes and acquiring synchronization time from a synchronization path; and
   determining, by the node to be detected, whether there is a fault in the synchronization link between the node to be detected and a Grandmaster Clock (GM) node by using all the reference times and the synchronization time,
   wherein the step of the node to be detected starting the detection function comprises:
   establishing, by the node to be detected, one or more detection links which are not overlapped with the existing synchronization link with the one or more reference nodes; and
   transmitting, by the node to be detected, a time fault detection message in the one or more detection links in a Transparent Clock (TC) mode.

2. The method according to claim 1, wherein the step of acquiring the reference time from the one or more reference nodes comprises:
   interacting, by the node to be detected, time stamp information with the one or more reference nodes via the time fault detection message through one or more detection links;
   calculating a time offset between the node to be detected and a corresponding reference node one by one according to the time stamp information acquired through the detection link; and
   calculating the reference time according to the time offset.

3. The method according to claim 1, wherein the step of the node to be detected determining whether there is a fault in the synchronization link between the node to be detected and the GM node by using all the reference times and the synchronization time comprises:
   detecting whether all the reference times are available reference times;
   in the case that all the reference times are not available reference times, ending;
   in the case that all the reference times are available reference times, selecting reference time and calculating a difference between the reference time and the synchronization time;
   in the case that the difference is greater than a preset fault threshold, determining that there is a fault in the synchronization link between the node to be detected and the GM node; and
   in the case that the difference is not greater than the preset fault threshold, determining that there is no fault in the synchronization link between the node to be detected and the GM node.

4. The method according to claim 3, wherein the step of detecting whether all the reference times are available reference times comprises:
   calculating a difference between any two of the reference times; and
   in the case that the calculated difference is less than a preset threshold, determining that all the reference times are available reference times.

5. The method according to claim 1, further comprising: before setting the one or more reference nodes corresponding to the node to be detected, detecting whether there is a synchronization link having a fault,
   wherein the step of detecting whether there is a synchronization link having a fault comprises:
   selecting a Boundary Clock (BC) node in a synchronization link, wherein the BC node acquires in real time a time offset between the BC node and a BC node in an adjacent synchronization link to serve as a comparison offset;
   calculating a difference between the comparison offset and a synchronization time offset; and
   in the case that the difference is greater than a preset time difference threshold, determining that the synchronization link on which the BC node is located has a fault.

6. The method according to claim 1, further comprising: before setting the one or more reference nodes corresponding to the node to be detected, detecting whether there is a synchronization link having a fault,
   wherein the step of detecting whether there is a synchronization link having a fault comprises:
   selecting, in a synchronization link, a BC node having a Global Positioning System (GPS) function, wherein the BC node acquires external reference time via the GPS function and checks synchronization time periodically acquired by itself;
   calculating a difference between the external reference time and the synchronization time;
   in the case that the difference is greater than a preset fault threshold, determining that the synchronization link on which the BC node is located has a fault; and
   in the case that the difference is not greater than the preset fault threshold, determining that the synchronization link on which the BC node is located has no fault.

7. A device for detecting a fault in a synchronization link, comprising:
   a processor; and
   a memory configured to store instructions that, when executed by the processor, cause the processor to:
   set one or more reference nodes corresponding to a node to be detected,
   acquire reference time from the one or more reference nodes and acquire synchronization time when the node to be detected starts the detection function, and
   determine whether there is a fault in the synchronization link between the node to be detected and a Grandmaster Clock (GM) node by using all the reference times and the synchronization time;
   wherein the processor executes the instructions further to establish one or more detection links which are not overlapped with the existing synchronization link with the one or more reference nodes and transmit a time fault detection message in the one or more detection links in a Transparent Clock (TC) mode.

8. The device according to claim 7, wherein
   the processor executes the instructions further to:
   interact time stamp information with the one or more reference nodes via the time fault detection message through the one or more detection links, calculate a time offset between the node to be detected and a corresponding reference node one by one according to the time stamp information, and calculate the reference time according to the time offset.

9. The device according to claim 7, wherein
   the processor executes the instructions further to:
   detect whether all the reference times are available reference times and end operations in the case that all the reference times are not available reference times;

in the case that all the reference times are available reference times, select reference time and calculate a difference between the reference time and the synchronization time;

in the case that the difference is greater than a preset fault threshold, determine that there is a fault in the synchronization link between the node to be detected and the GM node; and in the case that the difference is not greater than a preset fault threshold, determine that there is no fault in the synchronization link between the node to be detected and the GM node.

10. The device according to claim 9, wherein the processor executes the instructions further to:

calculate a difference between any two of the reference times, and in the case that the calculated difference is less than a preset threshold, determine that all the reference times are available reference times.

11. The device according to claim 7, the processor executes the instructions further to:

select a Boundary Clock (BC) node in a synchronization link, wherein the BC node acquires in real time a time offset between the BC node and a BC node in an adjacent synchronization link to serve as a comparison offset, calculate a difference between the comparison offset and a synchronization time offset, and in the case that the difference is greater than a preset time difference threshold, determine that the synchronization link on which the BC node is located has a fault.

12. The device according to claim 7, the processor executes the instructions further to:

select, in a synchronization link, a BC node having a Global Positioning System (GPS) function, wherein the BC node acquires external reference time via the GPS function and checks synchronization time periodically acquired by itself;

calculate a difference between the external reference time and the synchronization time;

in the case that the difference is greater than a preset fault threshold, determine that the synchronization link on which the BC node is located has a fault; and in the case that the difference is not greater than the preset fault threshold, determine that the synchronization link on which the BC node is located has no fault.

\* \* \* \* \*